W. B. SNOW.
Adjustable Car Wheels.
No. 106,737. Patented Aug. 23, 1870.
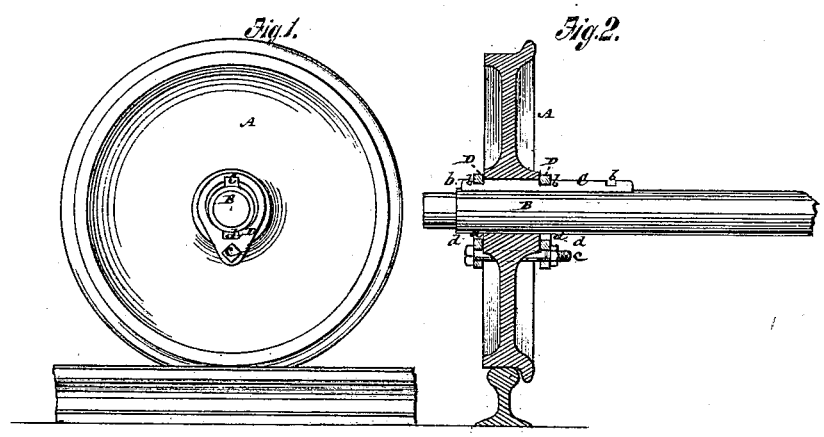

United States Patent Office.

WILLIAM B. SNOW, OF NEW YORK, N. Y.

Letters Patent No. 106,737, dated August 23, 1870.

IMPROVEMENT IN MEANS FOR ADJUSTING CAR-WHEELS TO DIFFERENT GAUGES.

The Schedule referred to in these Letters Patent and making part of the same

*To all whom it may concern:*

Be it known that I, WILLIAM B. SNOW, of the city, county, and State of New York, have invented a new and useful Improvement in Means for Adjusting the Wheels of Railroad-Cars or Trucks to Different Gauges or Widths of Rail; and I do hereby declare that the following is a full, clear, and exact description of the same, reference being had to the accompanying drawing forming part of this specification, and in which—

Figure 1 represents an exterior side view of a railroad-car wheel as secured on its axle, and mounted on a rail, in illustration of my improvement:

Figure 2, a vertical section of the same, taken in direction of the length of the axle; and Figure 3, a longitudinal view of one end or portion of the axle detached from the wheel.

Similar letters of reference indicate corresponding parts.

Adjustable-gauge wheels for railroad-cars, to adapt them to different gauges or widths of rail, have been variously constructed. Thus, in certain devices for changing gauge, sliding or reversible and loose keys have been used, and in other devices grooves have been cut around the axle, according to the number of changes necessary to be made, and the wheels suitably constructed to establish lock with said grooves. Loose keys are, in many respects, objectionable, and grooves cut around the axle destroy the strength of the outside fiber, and weaken the axle.

My invention removes these objections, and consists in a key or feather shrunk or inserted, in a fixed manner, within the axle, in direction of its length, and formed with cross-grooves or notches at suitable distances apart, for locking-attachments connected with the wheel to bite into or gear with, to hold the wheel at its required set, according to the gauge it is required to run upon.

The invention also includes a special construction of said locking-attachments, consisting of a band at each end of the hub, made to fit the notches in the key, and bolted together through the wheel.

Referring to the accompanying drawing—

A represents a railroad-car wheel, made to fit in a close, but sliding or adjustable manner, the axle B of the car or truck, and having a key-way in or through its hub, for the purpose of securing its fit over or along a fixed steel feather or key, C, inserted within the axle, and which is preferably secured therein by shrinking.

This fixed key has notches, $b$, in it, corresponding, in number and arrangement with the different gauges it is required to adapt the wheel to, said notches serving to receive the locking-attachments connected with the wheel.

These locking-attachments may consist of a loose band, D, arranged to freely fit the axle at either end of the hub of the wheel, and of a thickness or width that will enable them to enter the notches, $b$, in the key, so that, on adjusting them along the axle, and within either pair of notches on opposite sides of the interposed wheel, and passing a bolt, $c$, through them and the wheel, the latter is held in its required position on the axle, according to the gauge previously determined for it.

To give a close fit of these bands on the axle, and to relieve the bolt $c$ of strain, said bands are each formed with a key-way, $d$, in them, to facilitate their being slid along the key C when varying or adjusting the wheel on the axle, and so that, on turning said bands after they have been brought opposite the proper notches, $b$, in the key, they have a bearing secured to them, both against the bottoms of the notches in the key, and on the opposite side of the axle.

By using a fixed steel feather or key, notched as described, for making the adjustment of the wheel on the axle, the latter is not weakened as by cutting grooves in it to provide for the locking of the wheel.

What is here claimed, and desired to be secured by Letters Patent, is—

1. The fixed feather or key, C, in the axle B, formed with notches, $b$, for locking-attachments connected with the wheel to bite into or gear with, substantially as and for the purpose herein set forth.

2. The combination of the bands D and bolt $c$, arranged to pass through the wheel, with the notched fixed key, C, in the axle B, essentially as shown and described.

W. B. SNOW.

Witnesses:
FRED. HAYNES,
R. E. RABEAU.